United States Patent [19]
Miller

[11] Patent Number: 5,483,375
[45] Date of Patent: Jan. 9, 1996

[54] OPTICAL RATIO AMPLIFIER

[75] Inventor: David A. B. Miller, Fair Haven, N.J.

[73] Assignee: AT&T Corp., Murray Hill, N.J.

[21] Appl. No.: 355,753

[22] Filed: Dec. 14, 1994

[51] Int. Cl.[6] ................................................ H01J 40/14
[52] U.S. Cl. ...................................... 359/333; 359/244
[58] Field of Search ........................ 250/214 LA, 214 LS;
377/102; 359/244, 245, 259, 333, 344

[56] References Cited

U.S. PATENT DOCUMENTS

| | | | |
|---|---|---|---|
| 4,751,378 | 6/1988 | Hinton et al. | 377/102 X |
| 4,754,132 | 6/1988 | Hinton et al. | 377/102 X |
| 5,093,563 | 3/1992 | Lentine | 377/102 X |
| 5,288,990 | 2/1994 | Miller | 250/214 |
| 5,311,008 | 5/1994 | Miller | 250/214 |

OTHER PUBLICATIONS

"Novel Analog Self-Electrooptic-Effect Devices," D. A. B. Miller, *IEEE Journal of Quantum Electronics*, vol. 29, No. 2, Feb. 1993, pp. 678–698.
"Batch Fabrication and Operation of GaAs–$Al_xGa_{1-x}As$ Field–Effect Transistor–Self–Electrooptic Effect Device (FET–SEED) Smart Pixel Arrays," L. A. D'Asaro et al., *IEEE Journal of Quantum Electronics*, vol. 29, No. 2, Feb. 1993, pp. 670–677.
"The Quantum Well Self–Electrooptic Effect Device: Optoelectronic Bistability and Oscillation, and Self–Linearized Modulation," D. A. B. Miller et al., *IEEE Journal of Quantum Electronics*, vol. QE–21, No. 9, Sep. 1985, pp., 1462–1476.
Physics of Semiconductor Devices, S. M. Sze, Wiley, N.Y., Second Edition, 1981, p. 322.
Co–pending U.S. patent application Ser. No. 08/273,083 (D. A. B. Miller 50) filed Jul. 8, 1994 entitled "Apparatus For Converting Optical Bipolar Signals To Optical Unipolar Signals".
Co–pending U.S. patent application Ser. No. 08/273,042 (D. A. B. Miller 51) filed Jul. 8, 1994 entitled "Linear Optical Amplifier".

Primary Examiner—Mark Hellner
Attorney, Agent, or Firm—Stuart H. Mayer

[57] ABSTRACT

An apparatus for amplifying the optical power ratio includes first and second input electro-absorption modulators coupled together in series that each receive an optical input beam. First and second output electro-absorption modulators are coupled together in series and each generate an optical output beam. A voltage amplifier electrically couples a first node located between the first and second input modulators to a second node located between the first and second output modulators. In operation, the power ratio of the output beams is a function of the power ratio of the input beams.

7 Claims, 2 Drawing Sheets

OPTICAL RATIO AMPLIFIER

TECHNICAL FIELD

This invention relates generally to optical amplifiers, and more particularly, to an optical amplifier for amplifying a ratio of optical powers.

BACKGROUND OF THE INVENTION

Optical information processing entails the ability to perform analog operations such as correlation, convolution, and differentiation with optical beams. These operations provide results that are both positive and negative in value. Since the intensity of an optical beam is always positive, positive and negative values are sometimes represented as the difference in power between two optical beams. Various methods are known for processing such pairs of optical beams having an analog value determined by the difference in their power. Examples of such methods are described by Miller in *IEEE J. Quantum Electron.*, Vol. 29, Number 2, February 1993, pages 678–698. One limitation of these methods is that because of unavoidable attenuation of optical beams in optical systems, the analog value represented by the difference in power of the optical beams is also attenuated.

SUMMARY OF THE INVENTION

In accordance with this invention, an analog value is represented as a ratio of optical powers rather than as a difference in optical powers. Representing an analog value as a ratio of optical powers rather than as a difference in optical powers is advantageous because the power ratio will not be affected by an attenuation that affects both optical beams by an equal amount.

An apparatus for amplifying the optical power ratio includes first and second input electro-absorption modulators coupled together in series that each receive an optical input beam. First and second output electro-absorption modulators are coupled together in series and each generate an optical output beam. A voltage amplifier electrically couples a first node located between the first and second input modulators to a second node located between the first and second output modulators. In operation, the power ratio of the output beams is a function of the power ratio of the input beams.

In one embodiment of the invention the electro-absorption modulators are multiple quantum well diodes that form, for example, self-linearized modulators for generating one electron of photocurrent for each photon absorbed. In addition, the voltage amplifier may be a unity gain amplifier.

DETAILED DESCRIPTION

Figure 1:
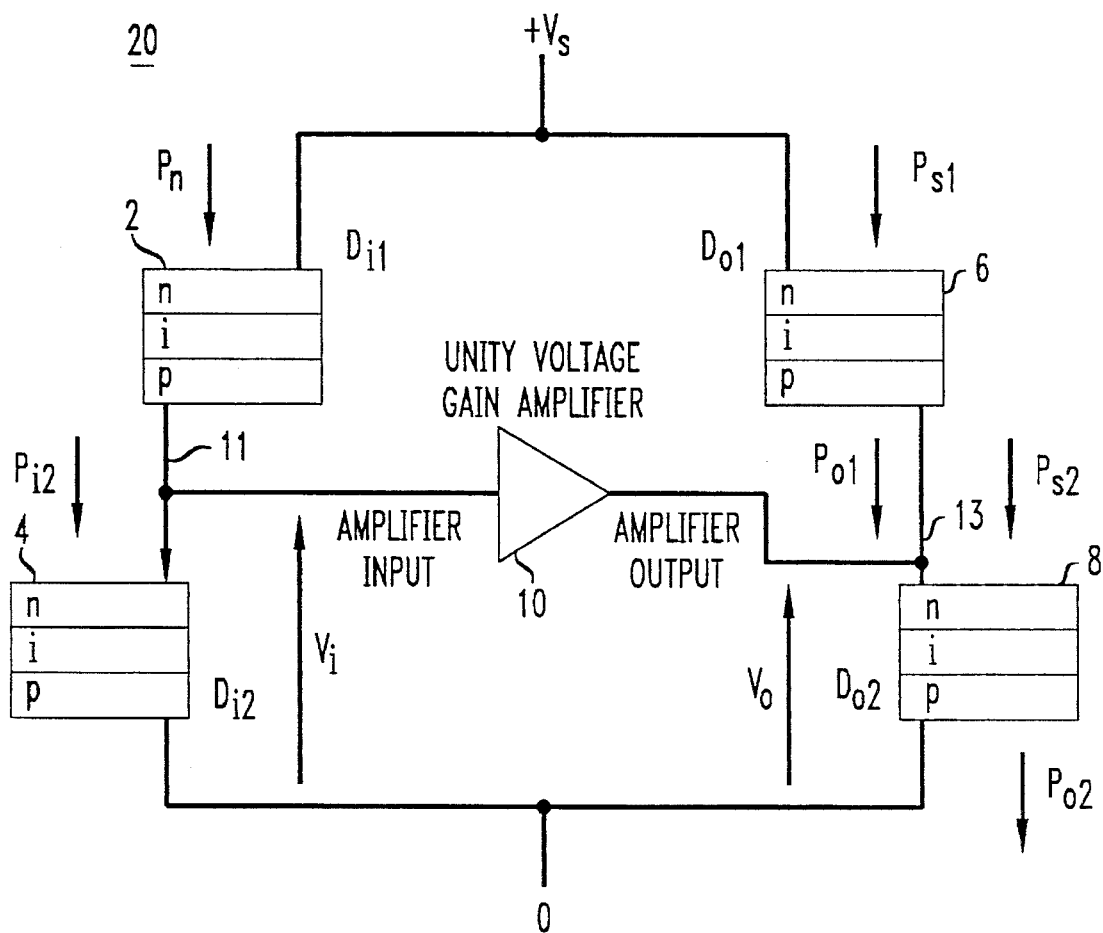
FIG. 1 shows one embodiment of the optical ratio amplifier in accordance with the present invention.

FIG. 1 illustrates one embodiment of the optical ratio amplifier 20 of the present invention. A bipolar input signal is represented by optical beams $P_{I1}$ and $P_{I2}$ and its analog value is equal to the power ratio $P_{I1}/P_{I2}$. A power ratio $P_{I1}/P_{I2}$ greater than one may, for example, represent a positive value while a power ratio $P_{I1}/P_{I2}$ less than one may represent a negative value. Representing an analog value as a ratio of optical powers rather than as a difference in optical powers is advantageous because the power ratio will not be affected by an attenuation that affects both optical beams by an equal amount.

The optical ratio amplifier 20 includes first and second input electro-absorption modulators 2 and 4 coupled together in series, as well as first and second output electro-absorption modulators coupled together in series. The electro-absorption modulators each generate a photocurrent that is proportional to the power of an optical beam incident thereon. A voltage amplifier 10 couples a first node 11 located between the first and second input modulators 2 and 4 to a second node 13 located between the first and second output modulators 6 and 8. In operation, the electro-absorption modulators are reversed-biased. In the embodiment of the invention shown in FIG. 1, a common voltage source is connected to the electro-absorption modulators 2 and 6 while the electro-absorption modulators 4 and 8 are connected to ground.

In operation, the optical input beams $P_{I1}$ and $P_{I2}$ are incident upon respective ones of the input modulators 2 and 4 and optical supply beams $P_{S1}$ and $P_{S2}$ are incident upon respective ones of the output modulators 6 and 8. As will be explained below, the output modulators 6 and 8 respond to the input beams by respectively generating optical output beams $P_{o1}$ and $P_{o2}$ whose ratio is only a function of the input power ratio $P_{I1}/P_{I2}$. To understand this relationship between input and output beams it is first necessary to observe that the operating voltage $V_1$ developed across the input modulator 4 depends only on the input power ratio $P_{I1}/P_{I2}$. This latter relationship may be understood by reviewing certain properties of electro-absorption modulators that are well-known to those of ordinary skill in the art.

Figure 2:
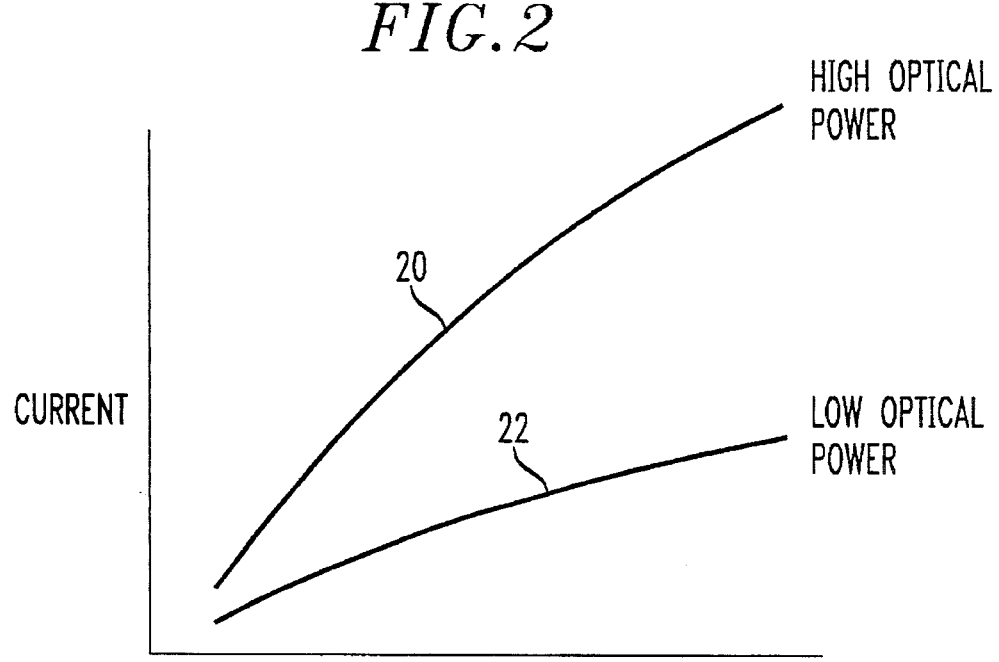
FIG. 2 shows an example of the current-voltage relationship for an electro-absorption modulator.

As noted above, electro-absorption modulators generate a photocurrent in response to an optical beam incident thereon upon the application of a reverse bias. The photocurrent that is generated is proportional to the power of the optical beam absorbed by the modulator. In certain cases, for a range of voltages, wavelengths, and incident powers, approximately one electron of photocurrent is generated for each photon absorbed. The amount of power that is absorbed by the modulator depends on the magnitude of the applied voltage (at least over certain voltage and wavelength ranges). Thus, for a given incident optical power, the photocurrent increases as the applied voltage increases. This behavior is illustrated in the FIG. 2, which shows an illustrative current-voltage relationship for an electro-absorption modulator. Each of the curves 20 and 22 represent the relationship for a different, but fixed value of the incident optical power. The curves 20 and 22 are approximately scaled versions of one another because the fraction of the incident power that is absorbed is substantially independent of the incident power at a given voltage and wavelength.

Figure 3:
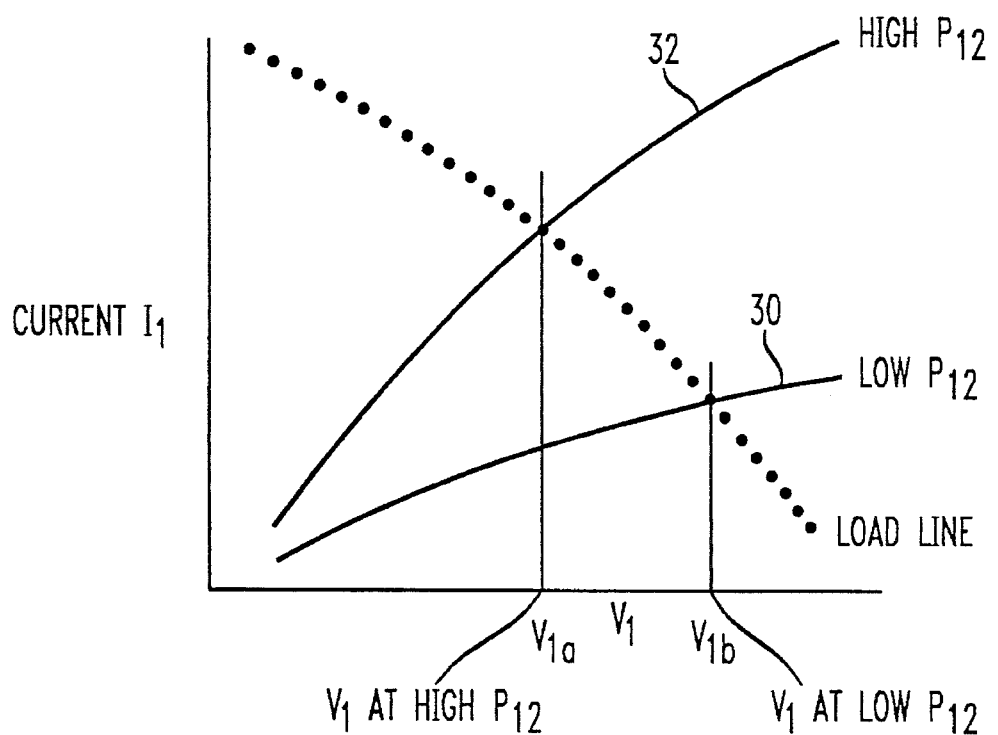
FIG. 3 shows a load-line diagram for the circuit of FIG. 1.

Based on the above-enumerated properties of the electro-absorption modulators, the voltage $V_1$ may be determined from a conventional load-line analysis. FIG. 3 shows a load-line diagram in which the solid curves 30 and 32 represent the current-voltage relationship for the input modulator 4 across which the voltage $V_1$ is applied. The current voltage relationship is based on the properties of the modulator discussed above and hence curves 30 and 32 are similar to those shown in FIG. 2. The dashed line in FIG. 3 represents the load-line for the input modulator 2 for a given input beam PI1 incident thereon.

The operating voltage $V_1$ across the input modulator 4 for a given incident beam power is determined by the intersection of the load-line with the current-voltage curve for that incident power. For example, FIG. 3 shows two different values of the operating voltage $V_1$ that correspond to different input beams $P_{I2}$ incident upon the input modulator 4. In particular, as the incident power changes from a low value (curve 30) to a high value (curve 32), the operating voltage $V_1$ decreases from $V_{1b}$ to $V_{1a}$.

The dependency between $V_1$ and the input power ratio $P_{I1}/P_{I2}$ may be seen from FIG. 3 by recognizing that if both $P_{I1}$ and $P_{I2}$ are changed by the same factor so that the ratio $P_{I1}/P_{I2}$ is unchanged, both the dashed load line and the current voltage curve will shift vertically by the same amount. As a consequence the operating voltage V1 does not change for a given ratio of $P_{I1}/P_{I2}$ even if the input beams $P_{I1}$ and $P_{I2}$ themselves change. That is, $V_1$ depends on the input power ratio $P_{I1}/P_{I2}$ and not directly on the values of the individual input beams $P_{I1}$ and $P_{I2}$.

The voltage $V_o$ provided at the output of the amplifier 10 and which is developed across the output modulator 8 is proportional to the operating voltage $V_1$. Thus, since $V_1$ depends on the input power ratio $P_{I1}/P_{I2}$, the voltage $V_o$ across the output modulator 8 also depends on the input power ratio $P_{I1}/P_{I2}$. As noted above, the fraction of the power absorbed by an electro-absorption modulator increases as the applied voltage increases. Since the voltage $V_o$ is applied across the output modulator 8, $V_o$ determines the fraction of the supply beam $P_{S2}$ absorbed by the output modulator 8 and thus $V_o$ determines the value of output beam $P_{o1}$. Furthermore, the voltage $V_o$ determines the voltage applied across the output modulator 6 and hence $V_o$ also determines the fraction of the supply beam $P_{S1}$ absorbed by the output modulator 6, or, in other words, $V_o$ determines the value of output beam $P_{o2}$. Thus, for a fixed value of the supply power ratio $P_{S1}/P_{S2}$, the output power ratio $P_{o1}/P_{o2}$ is a function of the voltage $V_o$. Finally, since $V_o$ is proportional to $V_1$, which in turn depends on $P_{I1}/P_{I2}$, the output power ratio $P_{o1}/P_{o2}$ is a function of only the ratio of the input powers $P_{I1}/P_{I2}$. In other words, the FIG. 1 device provides an output signal represented by the ratio $P_{o1}/P_{o2}$ that depends only on the value of an input signal represented by the ratio $P_{I1}/P_{I2}$. Moreover, the FIG. 1 device serves as an amplifier by employing supply powers $P_{S1}$ and $P_{S2}$ that are much more powerful than the input beams $P_{I1}$ and $P_{I2}$ that form the input signal. In this manner relatively weak input beams $P_{I1}$ and $P_{I2}$ control much more powerful output beams $P_{o1}$ and $P_{o2}$.

The present invention may employ any electro-absorption modulator for which the absorbed power increases with the applied voltage, such as a multiple quantum well diode, for example. One example of a modulator that may be employed is a self-linearized modulator, which generates one electron of photocurrent for every photon absorbed from the incident optical power beam. Self-linearized modulators are discussed in the reference by D. A. B. Miller et al., *IEEE Journal of Quantum Electronics*, Vol. QE-21, Number 9, September 1985, pages 1462–1476. While the electro-absorption modulators shown in FIG. 1 transmit light therethrough, other modulators may be employed in which the modulator contains a reflective surface for reflecting light back through the modulator.

Figure 4:
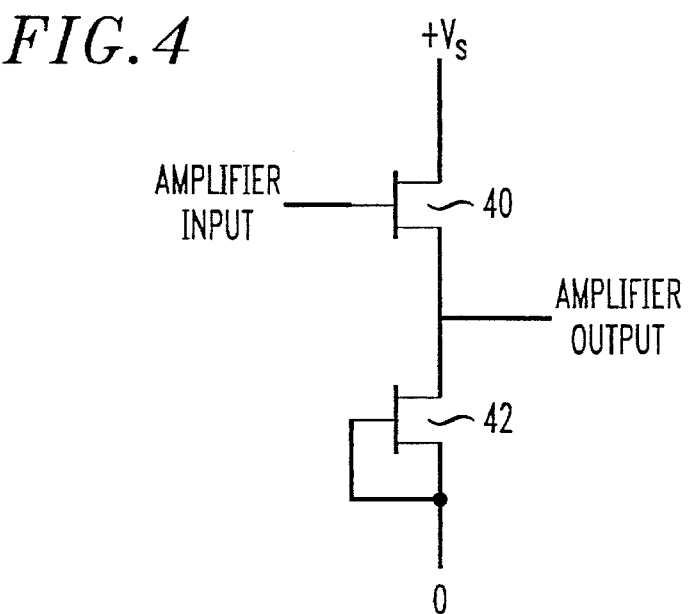
FIG. 4 shows an example of a known unity gain amplifier that may be employed in the present invention.

The present invention may employ any type of voltage amplifier that is desired. In one embodiment of the invention the voltage amplifier is a unity gain amplifier so that the voltage $V_1$ at the amplifier output equals the operating voltage $V_1$. FIG. 4 shows one example of a unity gain amplifier. This amplifier employs depletion mode field effect transistors (FETs) 40 and 42 that are arranged in a source-follower configuration. The depletion mode FETs can operate near a zero gate-source voltage. The arrangement provides substantially unity voltage gain between the amplifier input and output. Other unity gain amplifiers may also be employed, including those formed from operational amplifiers, which are well known to those skilled in the art. It is preferred that the voltage amplifier requires only low currents at its input, but is capable of delivering larger currents at its output while still maintaining a substantially fixed voltage gain between input and output.

The optical ratio amplifier of the present invention may be fabricated from discrete components or as a single component monolithically integrated on a semiconductor wafer. Monolithic integration employing enhancement-mode FETs may be achieved by using conventional GaAs fabrication technology such as described in S. M. Sze, *Physics of Semiconductor Devices*, Wiley, New York, 2nd ed. 1981, p. 322. Monolithic integration employing depletion-mode FETs, quantum well modulators, and photodetectors may be achieved, for example, by a method disclosed in L. A. D'Asaro et al., *IEEE Journal of Quantum Electronics*, Vol. 29, Number 2, February 1993, pages 670–677.

It will be understood that the particular embodiments described above are only illustrative of the principles of the present invention, and that various modifications could be made by those skilled in the art without departing from the scope and spirit of the present invention, which is limited only by the claims that follow. One such modification would include substituting a plurality of electro-absorption modulators coupled in parallel for each of the input electro-absorption modulators 2 and 4. In this case the device would respond to the ratio of the total power incident on each of the plurality of modulators. Another modification would include replacing the input modulators 2 and 4 with modulator circuits that are used to evaluate spatial derivatives, convolutions, and correlations. Examples of such circuits are disclosed in *IEEE J. Quantum Electron.*, Vol. 29, Number 2, February 1993, pages 678–698. In the present invention these circuits would not evaluate true derivatives in the mathematical sense, but would perform other useful functions, such as the detection of edges, bumps, and other features. Since the results of such operations depend on the ratio of local intensities and not on the local brightness of the image, objects may be recognized independently of their brightness in a scene of variable brightness.

I claim:

1. An apparatus for amplifying a ratio of optical powers, comprising:

first and second input electro-absorption modulators coupled together in series each for receiving an optical input beam;

first and second output electro-absorption modulators coupled together in series each for generating an optical output beam; and a voltage amplifier electrically coupling a first node located between the first and second input modulators to a second node located between the first and second output modulators.

2. The apparatus of claim 1 wherein said electro-absorption modulators are self-linearized modulators for generating one electron of photocurrent for each photon absorbed.

3. The apparatus of claim 1 wherein said electro-absorption modulators are multiple quantum well diodes.

4. The apparatus of claim 1 further comprising a voltage source coupled to said first input electro-absorption modulator and said first output electro-absorption modulator.

5. The apparatus of claim 1 wherein said voltage amplifier is a unity gain amplifier.

6. The apparatus of claim 1 further comprising first and second optical supply beams respectively incident upon said first and second output electro-absorption modulators.

7. The apparatus of claim 6 wherein said first and second optical supply beams are greater than the powers of first and second optical input beams respectively incident upon said first and second input electro-absorption modulators.

* * * * *